Aug. 11, 1925.
A. L. JOHNSTON, JR
1,549,261
SELF LOCKING CONNECTER FOR ANTISKID CHAINS
Filed March 3, 1921
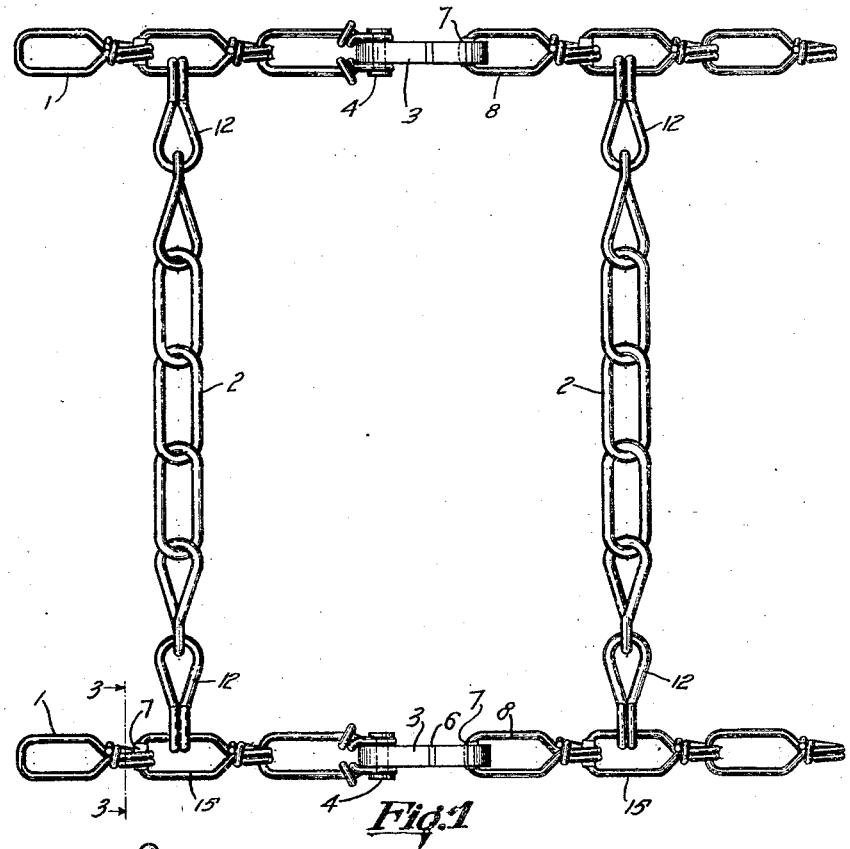
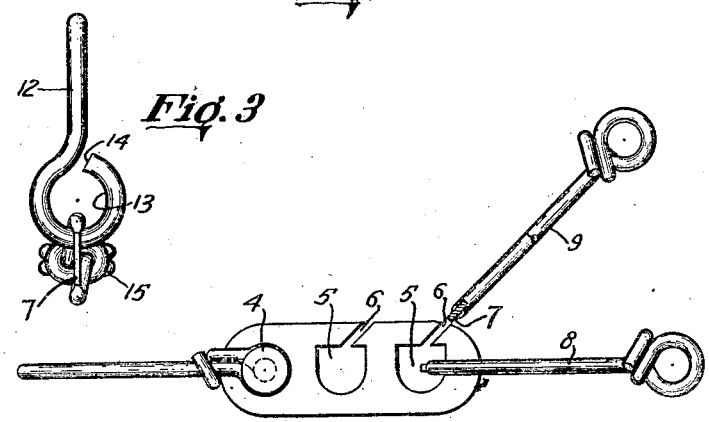

Patented Aug. 11, 1925.

1,549,261

UNITED STATES PATENT OFFICE.

ANDREW LANGSTAFF JOHNSTON, JR., OF NEW YORK, N. Y., ASSIGNOR, BY MESNE ASSIGNMENTS, TO OFF'N'ON CHAIN CORPORATION, OF NEW YORK, N. Y., A CORPORATION OF DELAWARE.

SELF-LOCKING CONNECTER FOR ANTISKID CHAINS.

Application filed March 3, 1921. Serial No. 449,490.

*To all whom it may concern:*

Be it known that I, ANDREW LANGSTAFF JOHNSTON, Jr., a citizen of the United States, residing at New York, in the county of New York and State of New York, have invented certain new and useful Improvements in Self-Locking Connecters for Antiskid Chains, of which the following is a full, clear, and exact description, such as will enable others skilled in the art to which it appertains to make and use the same.

This invention relates to anti-skid chains for vehicle tires and more particularly in some of its details to improvements in fastening devices, especially adapted for connecting the side members of anti-skid chains.

It is an object of the invention to provide reliable and efficient anti-skid chains capable of quick and easy application to a tire.

It is a further object of the invention to provide simple and secure fastening means for anti-skid chains.

Another object of the invention is to provide an anti-skid chain capable of inexpensive manufacture and assembly.

Other objects will be in part obvious and in part pointed out hereinafter.

In the accompanying drawing wherein is illustrated a preferred embodiment of the invention, Figure 1 is a plan view of a portion of an anti-skid chain embodying the invention;

Fig. 2 is an enlarged side view of the improved hook link and adjacent chain link; and Fig. 3 is an enlarged view from the line 3—3 of Fig. 1.

In general arrangement of parts and in function the apparatus employed is similar to standard devices for the prevention of skidding. Two circumferential side chains 1—1 adapted to be fastened snugly against the tire are joined by a plurality of cross chains 2 which, in use, pass over the tread of the tire and furnish ground gripping means to increase the traction. The links of the side chains may be of any suitable construction and a preferred form is illustrated in which each link is formed from a single strand of chain material bent into a large loop the free ends of which are further looped into eyes and bent to encircle and reinforce the neck of the eyes. The cross chains may be of standard construction and are preferably detachably secured to the side chains, as will be described.

The present improvement consists principally in the fastening means for joining the ends of the side chains and preferably for connecting the cross chains to the side chains, and in part comprises hook links 3 which may be permanently carried by a chain link as by means of a rivet 4 fastened through an aperture in the link 3 and through the eye of the chain and link. Each of the links 3 is provided with one or more eyes 5 substantially circular in shape and having a restricted entrance slot 6 preferably inclined as shown. At points along the chain 1 where connections are to be made, the chain link is flattened over a certain portion of its large loop as shown at 7 and the thickness of this flattened portion is slightly less than the width of the slot 6. To remove or apply a link 8 of the side chain 1 to the hook link 3 the link 8 is tilted to the position 9 (Fig. 2) or approximately into the same inclination as the slot 6. It will be obvious that at this position the flattened portion 7 of the link will slide easily within the slot 6 thus allowing removal or engagement of the large loop of the link 8 with the eye 5 of the hook link. When the chains are in use the link of the chain engaged by the hook link will normally assume a position on a line with the hook link as at 8 (Fig. 2), and from such a position the flattened portion of the chain link will present its wider dimension to the slot so that accidental disengagement will be precluded. Several eyes 5 are preferably provided for adjustment to keep the chains taut at all times.

Since certain alterations in the above construction might be made without departing from the spirit of the invention, it is intended that all matter contained in the above description or shown in the accompanying drawings shall be interpreted as illustrative and not in a limiting sense.

Having described my invention, what I claim as new and desire to secure by Letters Patent is—

In a connecting device for the free ends of side chains of anti-skid chains or the like, in combination, a hook-link adapted to be carried by the said chain and having an eye, a co-operating connecting link adapted to be connected to said side chain and having a flattened connecting portion, the plane of which lies substantially in the plane of said connecting link, said hook-link having a slot upwardly and forwardly inclined toward said connecting link and communicating with said eye, said flattened connecting portion being adapted to enter said slot when said connecting link lies substantially in the plane of said inclined slot, and such entry being resisted when said connecting link assumes oblique positions relatively to the plane of said slot.

In testimony whereof I affix my signature, in the presence of two witnesses.

ANDREW LANGSTAFF JOHNSTON, Jr.

Witnesses:
H. M. SEAMANS,
L. A. WATSON.